(12) United States Patent
Burr

(10) Patent No.: US 6,297,917 B1
(45) Date of Patent: Oct. 2, 2001

(54) FOCUSING DEVICE FOR AN OPTICAL MECHANISM

(76) Inventor: James D. Burr, 1960 Jefferson Co. Rd. 23, Evergreen, CO (US) 80439

( * ) Notice: Subject to any disclaimer, the term of this patent is extended or adjusted under 35 U.S.C. 154(b) by 0 days.

(21) Appl. No.: 09/531,238

(22) Filed: Mar. 21, 2000

(51) Int. Cl.$^7$ ............................... G02B 7/02; G02B 15/14
(52) U.S. Cl. ....................... 359/825; 359/823; 359/703
(58) Field of Search ................................. 359/819, 822, 359/823, 825, 826, 828, 830, 383, 425, 694, 698, 896, 703

(56) References Cited

U.S. PATENT DOCUMENTS

| | | | |
|---|---|---|---|
| 3,851,952 | 12/1974 | Werz et al. | 359/706 |
| 4,478,491 | 10/1984 | Kawai | 359/825 |
| 4,640,578 | 2/1987 | Turner et al. | 359/804 |
| 4,929,073 | 5/1990 | La Plante et al. | 359/848 |
| 4,961,115 | 10/1990 | Jessop | 348/374 |
| 4,993,801 | 2/1991 | Sarraf | 359/641 |
| 5,053,794 | 10/1991 | Benz | 396/432 |
| 5,303,090 | 4/1994 | Burr et al. | 359/823 |
| 6,069,754 | * 5/2000 | Schmidt | 359/825 |

OTHER PUBLICATIONS

Advertisement entitled "CCD–Photo–Visual Flip–Mirror Systems".

* cited by examiner

*Primary Examiner*—Georgia Epps
*Assistant Examiner*—Saeed Seyrafi
(74) *Attorney, Agent, or Firm*—Kolisch, Hartwell, Dickinson, McCormack & Hueser

(57) ABSTRACT

A focuser having a drawtube on which an eyepiece can be mounted, a track secured to the drawtube, and a base adapted to be mounted to an optical tube of a telescope. The base is movably engaged with the drawtube such that the drawtube and track are able to move relative to the base along an optical axis. A shaft is rotatably secured to the base and operatively engaged with the track such that rotation of the shaft effects movement of the drawtube relative to the base. This, in turn, results in relative movement between the eyepiece and optical tube along the optical axis, so as to focus the telescope. The drawtube, track and base are configured such that the base applies a first force to the drawtube and a second opposing force to the track to align the drawtube and track as they move along the optical axis.

27 Claims, 4 Drawing Sheets

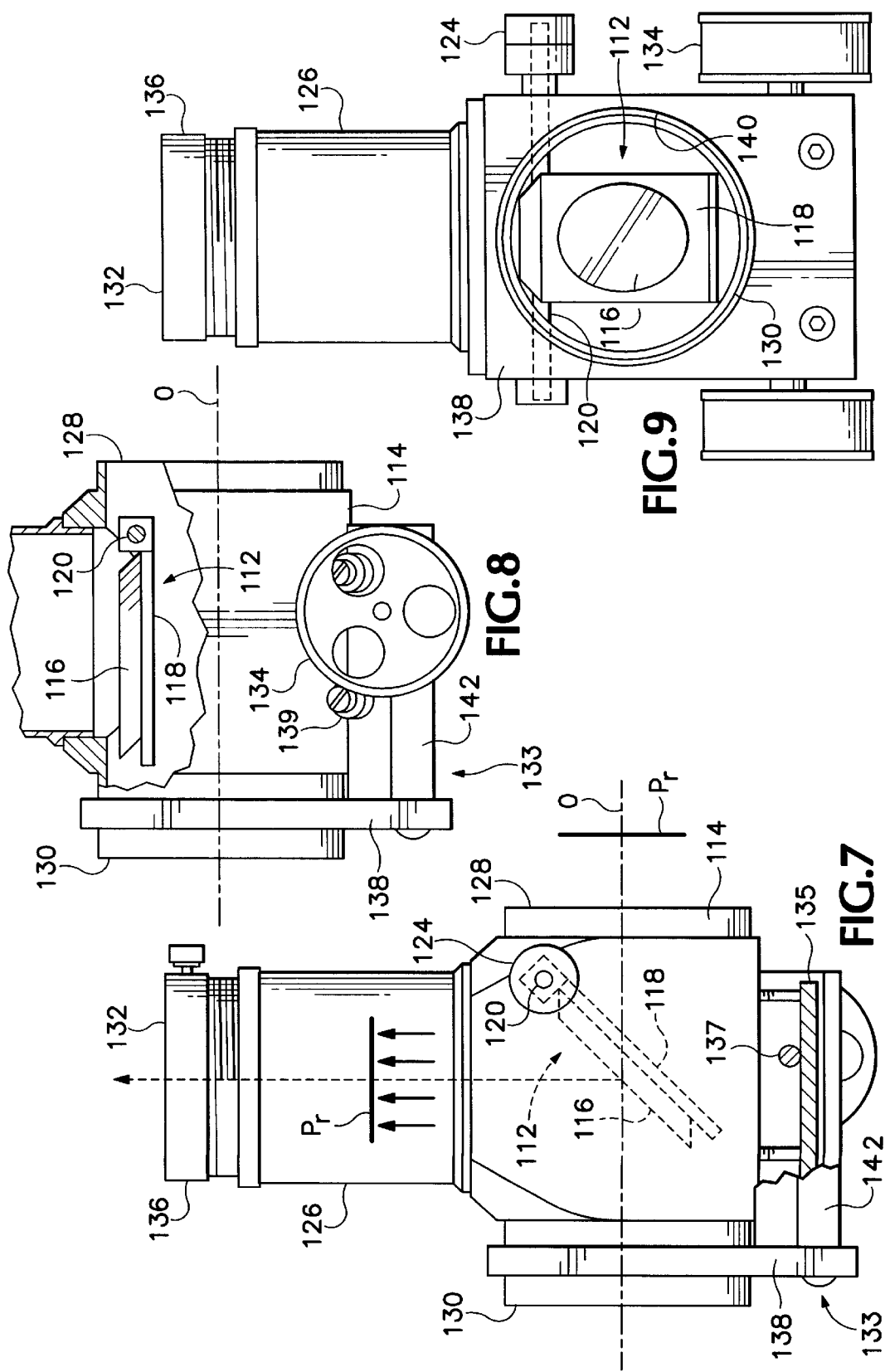

FOCUSING DEVICE FOR AN OPTICAL MECHANISM

TECHNICAL FIELD

The present invention relates generally to optical instruments, and more particularly to a device for focusing an optical instrument that achieves focus by effecting relative movement along an optical axis between two components of an optical system. Although the invention has wide utility in the field of optical devices, it has proven particularly useful in the context of focusing a telescope.

BACKGROUND OF THE INVENTION

A conventional reflecting telescope, it will be appreciated, employs a system of mirrors contained within an optical tube to gather and focus rays of light at a focal point. Typically, a primary mirror gathers and reflects light to a secondary mirror that reflects and focuses the light at a focal point. The light reflected from the secondary mirror can be viewed through an eyepiece. The telescope is focused by causing the optical tube focal point to coincide with the focal point of the eyepiece. A photographic plate or CCD sensor may be used instead of an eyepiece in certain applications to "view," or capture the light reflected from the secondary mirror.

Effecting relative movement between the focal points of the optical tube and eyepiece is the general method used to focus a reflecting telescope. This may be accomplished by moving the primary and secondary mirrors to change the position of the optical tube focal point. In this method, the optical tube and eyepiece remain in fixed positions relative to one another. A problem with this method is that moving the optical tube mirrors can cause the viewed image to shift, requiring that the telescope be re-aimed in order to view the original image.

Various mechanisms have been designed that allow a telescope to be focused without moving the optical tube mirrors. These include sliding drawtubes, threaded focusing tubes, rack and pinion systems, all of which are configured to move an eyepiece longitudinally relative to an optical tube. An example of such a focussing apparatus may be found in U.S. Pat. No. 5,303,090, the disclosure of which is incorporated herein by this reference thereto.

Known optical focuser designs are effective under most circumstances, though they do suffer from various problems and disadvantages. Some designs require use of components machined to within precise tolerances, making the focuser costly to manufacture and difficult to maintain. Where equipment does not meet these tolerances, whether due to poor construction or to inevitable wear, the telescope may suffer from problems related to jamming, rocking, or slippage of the moving parts. This, in turn, may result in poor alignment of the eyepiece relative to the optical tube. These failures can lead to difficulty in bringing the telescope into focus.

A problem common to drawtube designs is that they typically require supporting structures surrounding the drawtube to hold the drawtube aligned as it moves with respect to the optical tube. These supporting structures can decrease access to the drawtube, making it more difficult to integrate certain types of optical components into the focuser. For example, a flip mirror system, an optical component frequently used in conjunction with CCD sensors, cannot easily be integrated into known drawtube designs. Instead, the flip mirror system is provided as a separate component that must be affixed to the end of the focuser, increasing the size and weight of the structure attached to the optical tube of the telescope. Bulky and/or heavy attachments to the optical tube may imbalance the telescope, place unnecessary strain on the structure supporting the optical tube, decrease portability, and/or make the telescope difficult to aim or focus.

SUMMARY OF THE INVENTION

The focuser of the present invention includes an eyepiece holder that is adapted to be fixedly secured to an eyepiece and movably secured to a telescope's optical tube so that the eyepiece can be moved along the telescope's optical axis relative to the optical tube for purposes of focusing the telescope. The eyepiece holder includes spaced opposing surface portions located to one side of a plane bisected by the optical axis. The opposing surface portions are configured such that, when the eyepiece holder is movably secured to the optical tube of the telescope, the optical tube is held in alignment by opposing forces exerted upon the surface portions.

The configuration of the spaced opposing surface portions and the way that the surface portions are used to align the eyepiece holder provide an improvement over known focuser designs. Not only is the eyepiece holder firmly aligned as it moves and carries the eyepiece, but it is aligned without the opposed supporting structures required in previous eyepiece holder designs. As a result, the design offers increased access to the eyepiece holder, allowing additional optical accessories to be integrated with the invented focuser.

The focuser also may be provided with a base adapted to be mounted to the optical tube of the telescope. The eyepiece holder may include a drawtube movably engaged with the base and a track fixed to, and spaced apart from, the drawtube. In this embodiment, an advancement mechanism may be secured to the base and operatively engaged with the track to selectively cause the eyepiece holder to move relative to the base. The advancement mechanism may take the form of a shaft rotatably secured to the base and frictionally engaging the track such that rotation of the shaft effects relative movement between the eyepiece holder and base.

In another embodiment of the invention, the eyepiece holder may be fitted with a mirror rotatably disposed within the drawtube. The mirror typically is pivotal between a reflecting position wherein the mirror reflects light travelling through the drawtube out through an opening formed in a wall of the drawtube, and a retracted position wherein the mirror does not obstruct light travelling through the drawtube.

BRIEF DESCRIPTION OF THE DRAWINGS

FIG. 6 is a bottom plan view of a focuser similar to that shown in FIG. 4, but having yet another alternate base configuration.

FIG. 7 is a side view of an alternate embodiment focuser having a mirror rotatably disposed within a drawtube, the mirror being shown in a reflecting position.

FIG. 8 is a side view with cutaway of the focuser of FIG. 7, showing the mirror in a retracted position.

FIG. 9 is an end view of the focuser of FIG. 8.

DETAILED DESCRIPTION

As stated above, the present invention relates to an apparatus that effects relative movement between components of an optical instrument to focus the optical instrument. Though the invented apparatus may be used in various optical instruments, it is described herein for use in effecting relative movement between an optical tube of a telescope and an image-receiving device, such as an eyepiece, CCD sensor or photographic plate.

Figure 1:
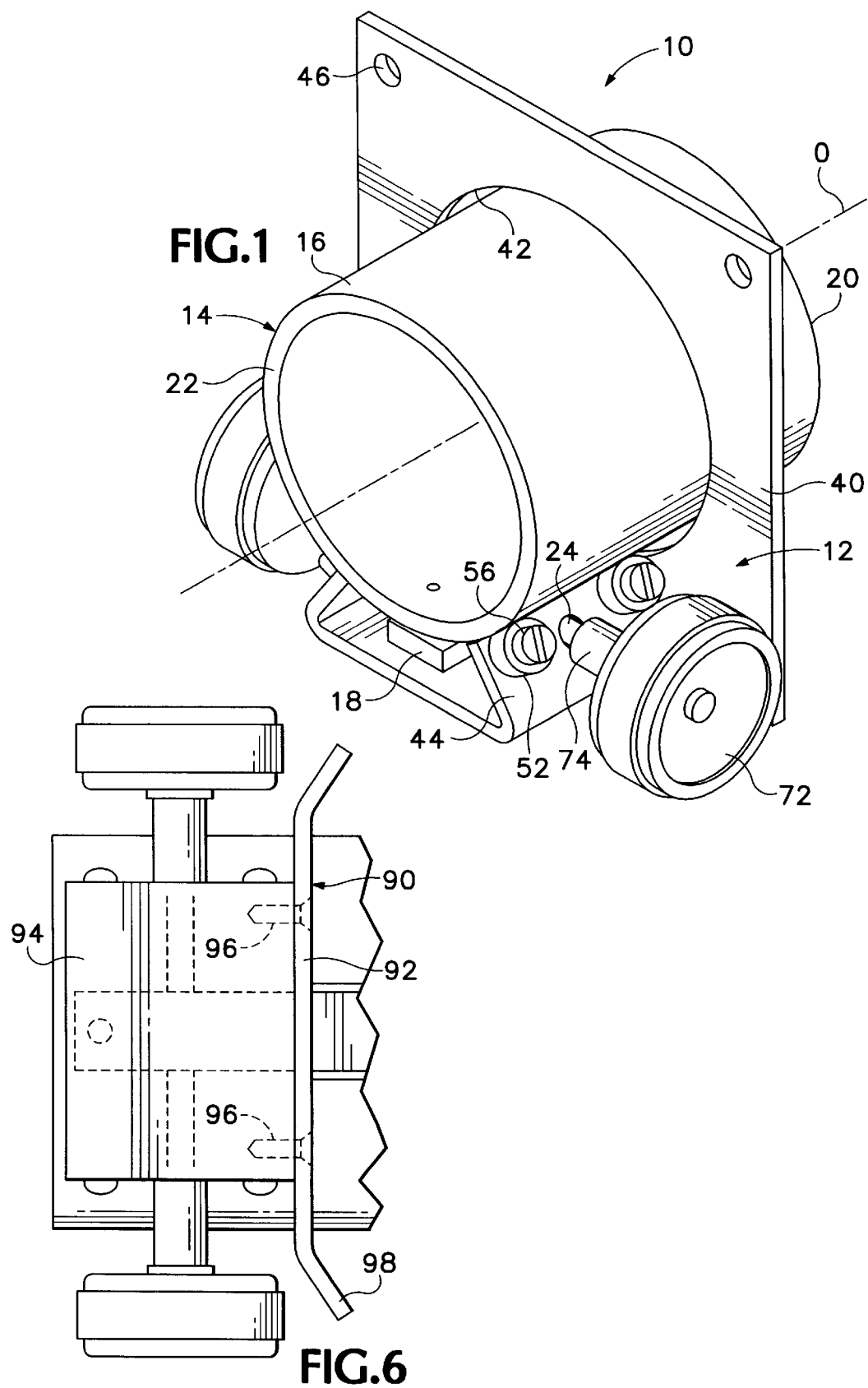
FIG. 1 is an isometric view of a focuser constructed according to the present invention.

FIG. 1 depicts a focuser 10, such focuser including a base 12 which is adapted to be secured to the optical tube of a telescope, and an eyepiece holder 14 which is movably engaged with the base. The eyepiece holder includes a drawtube 16 and a track 18 secured to the drawtube. Drawtube 16 is aligned with the telescope's optical tube, end-to-end, so that their axes are collinear, a first end 20 of the drawtube being received through an end of the optical tube. A second end 22 of the drawtube extends oppositely from base 12. In accordance with my teachings, the drawtube is adapted to carry an image-receiving device such as the telescope's eyepiece (not shown). The drawtube is held in alignment by base 12 and is engaged with the base such that the drawtube is movable relative to the base in a linear direction along optical axis O. This results in relative movement between the eyepiece and the optical tube, so as to focus the telescope.

Referring now to FIGS. 1 through 4, base 12 will be seen to include a main body 40 with an aperture 42 passing therethrough and an upstanding member 44 adjacent the aperture. Optical axis O passes through the center of drawtube 16 and through the center of aperture 42. Main body 40 and upstanding member 44 typically are rigid and lightweight, and may be either integrally or separately formed. The upstanding portion, however, is fixed relative to body portion 40. The main body and upstanding member typically are made from a rigid, lightweight metal, such as aluminum, that is machined, stamped or cast. In the depicted embodiment, the main body is welded to the upstanding member. The main body includes holes 46 through which bolts, screws or other fasteners may be received to secure the base to the optical tube of the telescope. Aperture 42 is dimensioned to allow drawtube 16 and track 18 to pass through the aperture. Though depicted as generally circular, it will be appreciated that aperture 42 may be of any size and shape that permits passage of the drawtube and track therethrough.

Upstanding member 44 typically extends from main body 40 perpendicularly, in a direction generally parallel to optical axis O. In the depicted embodiment, upstanding member 44 includes a central body portion 48 and two flank portions 50. As seen most clearly in FIG. 2, flank portions 50 extend from central body portion 48 toward drawtube 16 in generally radial directions. Bearings 52 are provided on the flank portions for movably engaging an exterior surface 54 of the drawtube. In the depicted embodiment, bearings 52 are configured to roll along the exterior surface of the drawtube so as to permit the drawtube and track to move linearly along optical axis O through aperture 42. The depicted bearings are cylindrical and are fastened to the flank portions via threaded fasteners 56. Typically, four bearings are used so that, the drawtube being forced into engagement with the bearings as will be described below. The drawtube thus is held aligned with the optical axis and allowed to move only along the optical axis.

Focuser 10 includes an advancement mechanism secured to base 12 for selectively causing drawtube 16 and track 18 to move relative to the base along optical axis O. Such advancement mechanism typically takes the form of a shaft 24 which is spaced from drawtube 16, but which operatively engages track 18. Although shaft 24 directly engages track 18 in the depicted embodiment, it will be appreciated that the shaft may be coated with frictionally adhesive material or the like. Track 18 is fixed relative to drawtube 16 such that rotation of the shaft along an engagement surface 78 of the track effects movement of the track and drawtube along the optical axis. Rotation of shaft 24 thus results in a relative movement between the eyepiece and the optical tube, so as to focus the telescope.

In the depicted embodiment, track 18 is an elongate plate which extends along at least a portion of the length of drawtube 16. The track typically is secured to drawtube 16 via adjustable fasteners 58, and is spaced apart from the drawtube. However, those skilled will appreciate that the track may be integrally formed with the drawtube so long as the track and drawtube provide opposing surfaces to accommodate translation of the drawtube as will now be described.

Where the track is secured to the drawtube via threaded fasteners, the fasteners may be used to adjust the spacing between the track and the drawtube. The fasteners may be received through holes provided at positions along the length of the track and corresponding holes provided through drawtube 16. Preferably, the fasteners are positioned near the ends of track 18, providing defined limits to passage of shaft 24 along the track.

Figure 3:
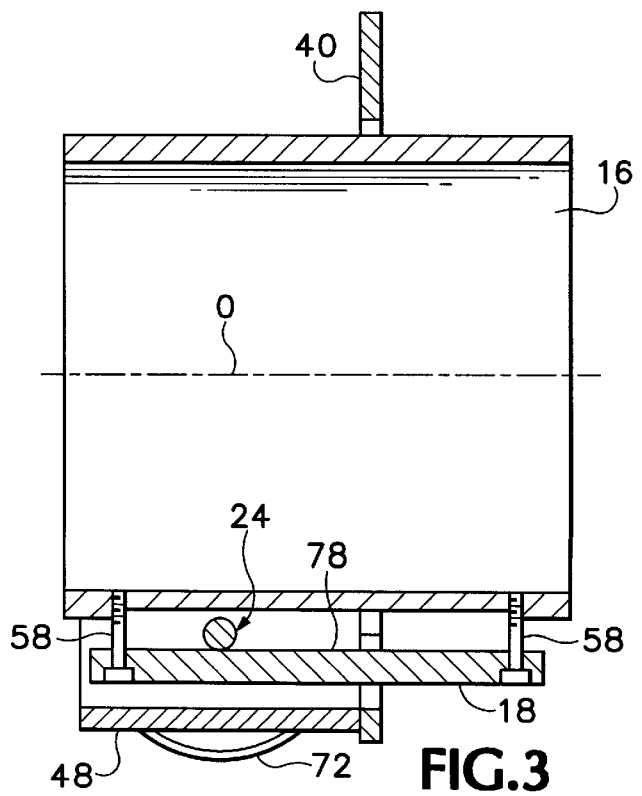
FIG. 3 is a cross-sectional side view of the focuser of FIG. 2.
Figure 4:
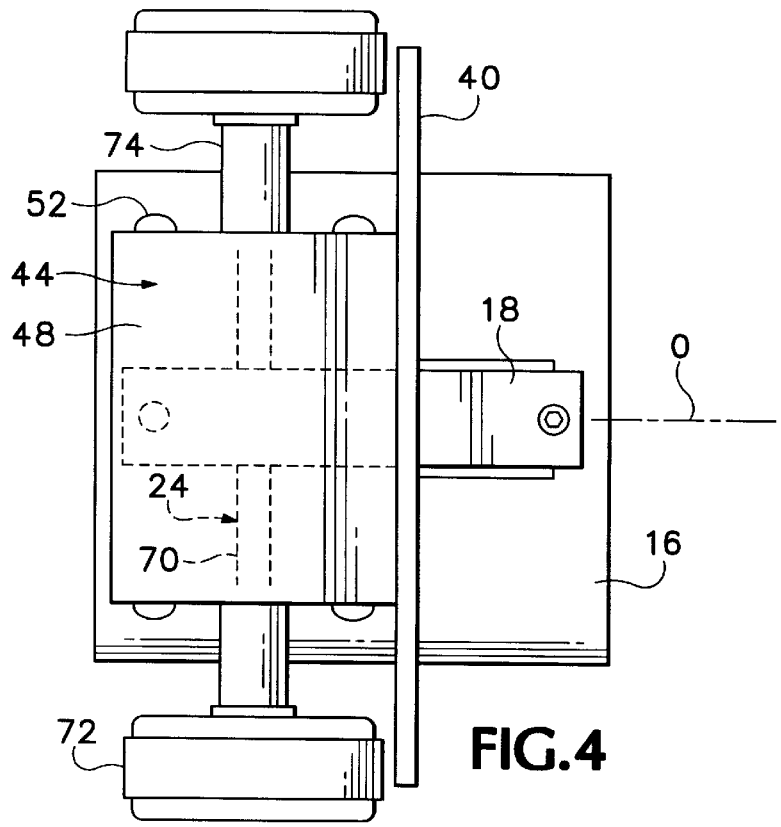
FIG. 4 is a bottom plan view of the focuser of FIG. 1.

The holes in the drawtube may be provided with threads, the threaded fasteners being tightened from the side of the track facing away from the drawtube. When the fasteners are configured this way, the holes in the track are typically countersunk to accommodate the heads of the threaded fasteners, as shown in FIG. 3. Alternatively, the fasteners may be tightened and loosened from the interior of the drawtube, in which case the track holes are threaded and the holes in the drawtube are countersunk.

Tightening and loosening of the threaded fasteners adjusts the spacing between the engagement surface of the track and the exterior surface of the drawtube. Spacers or washers (not shown) may be provided on the threaded fasteners between the track and drawtube to prevent the drawtube and track from being spaced closer than a selected minimum spacing. Once the fasteners are tightened so that the track is brought into contact with the shaft, further tightening increases the magnitude of opposing forces $F_1$ and $F_2$ (to be discussed below) that hold the drawtube in alignment.

Shaft 24 is rotationally mounted on the base via holes in the flank portions of upstanding member 44. A central shaft portion 70 passes between flank portions 50 and is transversely interposed between track 18 and drawtube 16. Knobs 72 are provided at the ends of the shaft to facilitate manual rotation of the shaft. Spacers 74 are provided on two outer portions of the shaft between the knobs and the flank portions of the upstanding member to keep central shaft portion 70 centered between the flank portions. The shaft is spaced from the exterior surface of the drawtube and is operatively engaged with a substantially flat engagement surface 78 defined on a portion of track 18 which faces the exterior surface of the drawtube.

Shaft 24 frictionally engages engagement surface 78 such that rotation of the shaft exerts an advancing or retreating force upon track 18 parallel to optical axis O. This force, in turn, causes the drawtube to move along the optical axis relative to base 12. The relative position of the drawtube and base thus may be selectively adjusted along the optical axis by rotating the shaft. Accordingly, when focuser 10 is used in connection with a telescope, the shaft may be rotated to effect movement of an eyepiece relative to the telescope's optical tube, and thus to effect focus the telescope.

Though the advancement mechanism depicted includes a rotating shaft which frictionally engages a track, it will be understood that other configurations can be used. For example, the shaft and track may be provided with complementary gears or teeth, so that rotating the shaft effects relative movement of the drawtube relative to the base.

Figure 2:
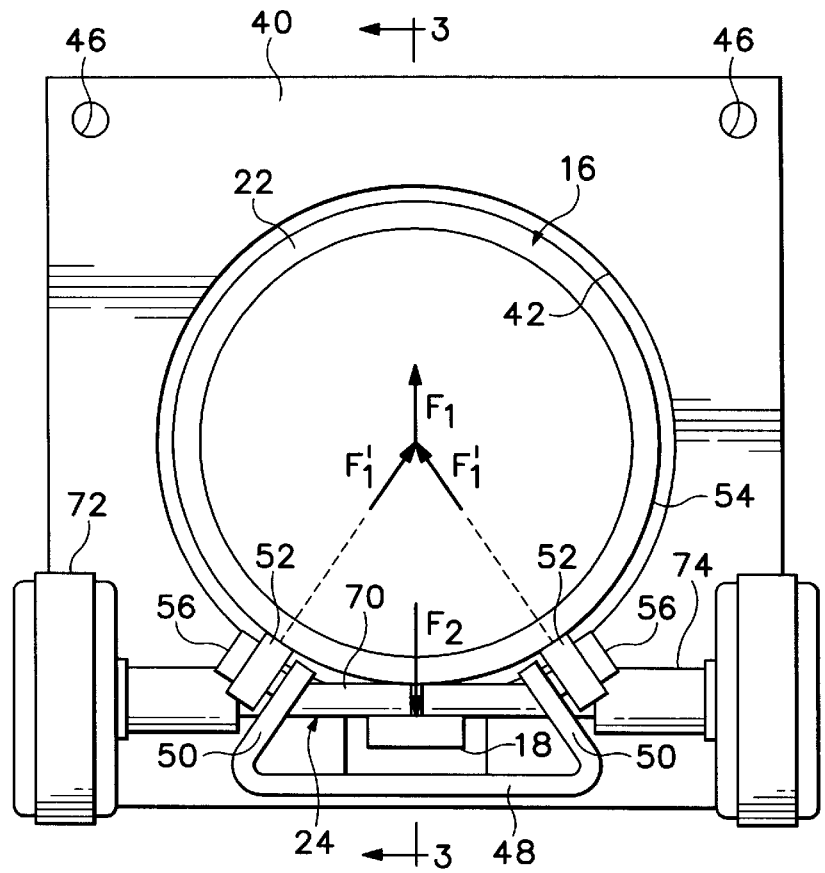
FIG. 2 is an end view of the focuser of FIG. 1.

From the foregoing discussion, it will be appreciated that eyepiece holder 14, which includes drawtube 16 and track 18, is held in alignment as it moves along the optical axis O by opposing forces exerted on the eyepiece holder. Specifically, and as indicated in FIG. 2, bearings 52 exert radial vector forces $F_1'$ on drawtube 16, the radial vector forces combining to create upwardly directed force $F_1$. Shaft 24, which is secured to the base, exerts an equal and opposite force $F_2$ upon engagement surface 78, defined on track 18. Track 18, it will be recalled, is fixed relative to drawtube 16. Accordingly, opposing forces $F_1$ and $F_2$ cause the drawtube and track to be held in alignment with the base as the eyepiece holder moves along optical axis O. The configuration of the track and drawtube allows these opposing forces to be applied to the track and drawtube on one side of a plane bisected by the optical axis. Thus, no additional support structure is required opposite upstanding portion 44.

Figure 5:
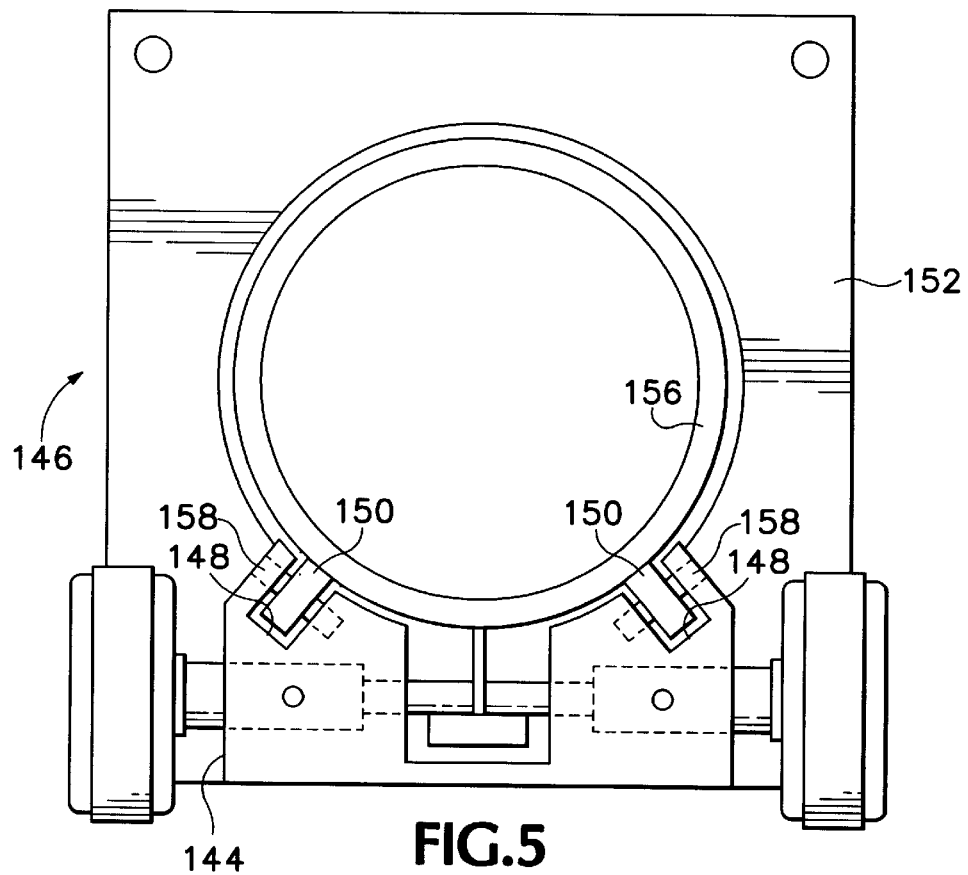
FIG. 5 is an end view of a focuser similar to that shown in FIG. 2, but having an alternate base configuration.

FIG. 5 depicts an alternate configuration for the base. In this configuration, upstanding member 144 of base 146 includes bearing receiving slots 148 in which bearings 150 are disposed. Slots 148 may be elongate and extend from main body 152 of base 146 all the way to the distal end of upstanding member 144, as depicted, or, alternatively, the slots may be formed in any size and shape to accommodate the bearings. Bearings 150 are positioned within slots 148 so that the bearings extend out of the slots beyond upstanding member 144 to contact the exterior surface of drawtube 156. The bearings are held in place by pins 158 received through transverse holes provided in upstanding member 144.

FIG. 6 depicts yet another alternate configuration of the base. In this configuration, base 90 includes a main body 92 and an upstanding member 94 formed separately from the main body. Upstanding member 94 may be machined, stamped or cast. Typically, however, the upstanding member is formed from sheet metal. Upstanding member 94 is secured to main body 92 with fasteners such as screws 96. In this configuration, the main body has flared end portions 98, though the base of the invented focuser may be of any size and shape suitable for securing the focuser to a telescope or other optical device.

FIGS. 7, 8 and 9 depict an alternate embodiment of the focuser, the focuser being provided with a flip mirror assembly 112 disposed within drawtube 114. Flip mirror assembly 112 includes a mirror 116 secured to substrate 118. The substrate is secured at one end to a pin 120 that extends through the interior of drawtube 114 and has an exposed end projecting out of the drawtube. Knob 124 is mounted to the exposed end of pin 120 to facilitate manual rotation of the pin, and thus of mirror 116.

This embodiment also includes a viewing tube 126 fitted to an opening formed in the wall of drawtube 114 between opposite open ends 128 and 130 of the drawtube. Drawtube end 128 is configured for attachment to a CCD sensor to photograph images. Drawtube end 130 is configured for alignment with the telescope's optical tube. A distal end 132 of viewing tube 126 is adapted so that a telescope eyepiece may be mounted thereon.

As with the previously described embodiments, the depicted embodiment has a base 133 movably engaged via bearings 139 with drawtube 114, a track 135 fixed to and spaced apart from the drawtube, and a shaft 137 rotatably secured to the base that frictionally engages the track. Base 133 includes a main body 138 having an aperture 140 passing therethrough, and an upstanding member 142 extending perpendicularly from the main body adjacent the aperture. As before, rotation of shaft 137 causes the drawtube to move relative to the base along optical axis O through the aperture.

Rotation of pin 120 causes substrate 118 and mirror 116 to pivot within the interior of drawtube 114 such that the mirror may be pivoted to a reflecting position, as shown in FIG. 6. In the reflecting position, the mirror is positioned within the path of light travelling through the interior of the drawtube and is angled to cause light to be reflected upwardly through viewing tube 126. Typically, the mirror is positioned at a 45-degree angle within the drawtube when in the reflecting position, so that light travelling along optical axis O is reflected at a right angle, as shown. Adjustable stops or guides may be provided on the interior surface of the drawtube to accommodate adjustment of the mirror's angular orientation when in the reflecting position.

From the reflecting position, the mirror may be folded against the interior wall of the drawtube into a retracted position, as shown in FIG. 8, in which light is allowed to pass through the drawtube along optical axis O. This configuration is particularly useful in telescope applications employing a CCD sensor to photograph images. In these applications, the focuser is secured to an optical tube of a telescope, with drawtube end 130 being received through an opening on the end of the optical tube. A CCD sensor (not shown) is mounted to drawtube end 128, and an eyepiece 132 is secured to distal end 132 of the viewing tube. The focuser is thus configured between the telescope's optical tube and the CCD sensor, with the viewing tube and eyepiece allowing a user to view images reflected upwardly by the mirror.

When mirror 116 is rotated into the reflecting position, a user may focus the telescope by rotating one of knobs 134 rotate shaft 137 and thus effect movement of drawtube 114 relative to the optical tube. Because the mirror is in the reflecting position, the user can look through the eyepiece while focusing the telescope to view the exact image that will pass through to the CCD sensor once the mirror is retracted. After the image has been focused, the mirror is retracted to allow the focused image to be captured by the CCD sensor.

Distal end 132 of viewing tube 126 is provided with a threaded barrel adjustment mechanism 136 for adjusting the effective length of viewing tube 126 to accommodate eyepieces of varying focal lengths. In the reflecting position, mirror 116 reflects an image plane P, to be received at the CCD sensor when the mirror is retracted, into the viewing tube as reflected image plane $P_r$. A particular eyepiece is configured for use with the depicted focuser by adjusting the length of viewing tube 126 so that the focal point of the eyepiece coincides with reflected image plane $P_r$.

It will be appreciated that integration of the flip mirror assembly into the focuser of the present invention is made possible by the novel way in which the drawtube of the present invention is held in alignment by the base. The design allows the drawtube to be held aligned without requiring that supporting structures be provided on opposite sides of the drawtube. Rather, the drawtube is engaged by the base on only one side, leaving the opposite side free for integration of the viewing tube.

While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various features, elements, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are different, broader, narrower or equal in scope to the original claims, are also regarded as included within the subject matter of applicant's invention.

I claim:

1. A focuser configured to effect relative movement between an eyepiece and an optical tube of a telescope, comprising:

an eyepiece holder adapted to be movably secured to the optical tube and fixedly secured to the eyepiece to carry the eyepiece along an optical axis relative to the optical tube, the eyepiece holder including spaced opposing surfaces such opposing surfaces being located to one side of a plane bisected by the optical axis, the spaced opposing surfaces being configured such that when the eyepiece holder is movably secured to the optical tube, the optical tube operatively exerts a first force upon one of the spaced opposing surface portions and a second opposing force upon another of the spaced opposing surface portions to align the eyepiece holder as the eyepiece holder moves along the optical axis.

2. The focuser of claim 1, further comprising a base adapted to be secured to the optical tube such that the optical tube exerts the opposing forces upon the spaced opposing surface portions via the base, the eyepiece holder being movably engaged with the base so that the eyepiece holder is movable along the optical axis relative to the base, the eyepiece holder including a drawtube and a track fixed to the drawtube, wherein said one of the spaced opposing surfaces is located on the drawtube, and wherein said another of the spaced opposing surfaces is located on the track.

3. The focuser of claim 2, wherein the base has an aperture passing therethrough, and wherein the drawtube moves through the aperture as the drawtube moves relative to the base along the optical axis.

4. The focuser of claim 2 which further comprises an advancement mechanism secured to the base, the advancement mechanism being configured to operatively engage the track to cause the track and drawtube to move relative to the base along the optical axis.

5. The focuser of claim 2, wherein the base includes one or more bearings which engage the drawtube, and wherein the advancement mechanism includes a shaft rotatably mounted on the base to frictionally engage the track such that rotating the shaft effects movement of the track and drawtube relative to the base along the optical axis.

6. A focuser, comprising:
a base;
a drawtube movably engaged with the base; and
a track secured to the drawtube in spaced relation to the drawtube,
wherein the drawtube and track are movable along an optical axis relative to the base, and wherein the base, drawtube, and track are configured such that the base operatively exerts a first force upon the drawtube and a second force upon the track, the second force opposing the first force to align the drawtube and the track during movement relative to the base along the optical axis.

7. The focuser of claim 6, further comprising an advancement mechanism secured to the base and operatively engaged with the track to selectively cause the track and drawtube to move relative to the base along the optical axis.

8. The focuser of claim 7, wherein the advancement mechanism includes a shaft rotatably secured to the base and frictionally engaging the track such that rotating the shaft effects movement of the track and drawtube relative to the base along the optical axis.

9. The focuser of claim 8, wherein the shaft is interposed the drawtube and track.

10. The focuser of claim 6, wherein the track includes a substantially flat engagement surface facing the drawtube, the focuser further comprising a shaft that is rotatably secured to the base and frictionally engaged with the engagement surface such that rotation of the shaft effects movement of the track, and correspondingly effects drawtube relative to the base along the optical axis.

11. The focuser of claim 6, wherein the track is adjustably secured to the drawtube to accommodate adjustment of the spacing between the track and the drawtube.

12. The focuser of claim 6, wherein the drawtube, track and base are configured such that the first and second forces operatively exerted by the base upon the track and drawtube are exerted on one side of a plane bisected by the optical axis.

13. The focuser of claim 6, wherein the base includes one or more bearings which movably engage the drawtube.

14. The focuser of claim 6, wherein the bearings are held within slots formed in the base.

15. The focuser of claim 6, wherein the base defines an aperture passing therethrough, and wherein the drawtube moves through the aperture along the optical axis.

16. The focuser of claim 6, wherein the base includes an upstanding member which engages the drawtube such that the drawtube and track are held in alignment by the upstanding member during movement along the optical axis.

17. The focuser of claim 16, wherein the upstanding member includes a central body portion and two flank portions, each flank portion being configured to extend from the central body portion toward the drawtube to movably engage the drawtube.

18. The focuser of claim 17, wherein the drawtube is cylindrical, and wherein the flank portions extend toward the drawtube in a radial direction.

19. The focuser of claim 17 which further comprises a shaft rotatably received through opposing holes in the flank portions of the upstanding member, the shaft being configured to frictionally engage the track such that rotating the shaft effects movement of the track and drawtube along the optical axis.

20. A focuser for use in moving an eyepiece relative to an optical tube of a telescope, the focuser comprising:

a base including a body configured for securement to an optical tube of a telescope and an upstanding member projecting from the body;

a drawtube operatively engaging the upstanding member of the base and controllably movable relative to the base along an optical axis to effect adjustment of an eyepiece held by the drawtube, the drawtube having an exterior surface;

a track secured to the drawtube in spaced relation to the drawtube, the track having an engagement surface facing the exterior surface of the drawtube; and a shaft rotatably mounted on the upstanding member and transversely interposed the exterior surface of the drawtube and the engagement surface of the track, the shaft being in operative engagement with the engagement surface of the track such that rotation of the shaft effects movement of the track, and correspondingly, movement of the drawtube along the optical axis relative to the base.

21. The focuser of claim 20, wherein the upstanding portion of the base is formed separately from the body and is secured to the body.

22. The focuser of claim 20, wherein the track is adjustably fastened to the drawtube to accommodate adjustment of the track to selectively bear against the shaft.

23. The focuser of claim 20, wherein the upstanding member includes a central body portion and two flank portions, the flank portions extending from the central body portion toward the drawtube to bear against the drawtube.

24. The focuser of claim 23, wherein the flank portions each include one or more bearings that movably engage the exterior surface of the drawtube.

25. The focuser of claim 23, wherein each flank portion bears radially against the drawtube.

26. The focuser of claim 23, wherein the shaft is rotatably received through holes in the flank portions.

27. An apparatus for use in adjusting ocular mechanism in an optical instrument, the apparatus comprising:

a base configured for attachment to the optical instrument;

an elongate drawtube configured to carry an ocular mechanism, movable relative to the base along an optical axis, the drawtube having a tube wall extending between a pair of opposite open ends and an transverse opening formed in the tube wall at a position between the opposite open ends;

a mirror rotatably disposed within the drawtube, the mirror being rotatable between a reflecting position wherein light travelling through the drawtube along the optical axis is reflected by the mirror out through the transverse opening, and a retracted position wherein light travels through the drawtube between the opposite ends without reflection by the mirror;

a track secured to the drawtube in spaced relation with the drawtube; and a shaft rotatably mounted to the base to frictionally engage the track such that rotation of the shaft effects movement of the track and drawtube along the optical axis relative to the base.

* * * * *